Patented Mar. 4, 1952

2,587,578

UNITED STATES PATENT OFFICE 2,587,578

PREPARATION OF PHENOLIC RESINS THAT PRODUCE LIGHT-COLORED VARNISH COATINGS

John Leslie Jones, Los Angeles, Calif., assignor to Libbey-Owens-Ford Glass Company, Toledo, Ohio, a corporation of Ohio No Drawing. Application February 19, 1947, Serial No. 729,666

23 Claims. (Cl. 260—19)

The invention relates to the preparation of oil-soluble phenolic resins that produce varnish coatings of greatly improved color.

When a resin is to be used in the manufacture of a varnish, it must be oil-soluble and capable of producing a varnish that, when applied to a surface, gives a light-colored, rapidly drying coating. An oil-soluble resin is one that forms a solution when cooked with the vehicles used in the manufacture of varnishes, such as the drying and semidrying oils. The color of the resulting varnish coating not only must be light or pale but also must not unreasonably darken upon aging.

Resins formed by the reaction of substituted phenols with formaldehyde produce varnish coatings that are unique in their resistance to boiling water. The reaction of formaldehyde with o-substituted phenols, however, produces resins that are very dark and are, in general, unsatisfactory for use in varnishes. Water-resistant varnish coatings may be produced from oil-soluble phenolic resins prepared by reacting formaldehyde with p-substituted phenols such as p-butyl phenol and p-phenyl phenol. However, the varnish coatings so produced have been yellow in color and have become darker on aging, so that they have been unsuitable for use in interior decorating.

Resins obtained by reacting formaldehyde with p-alkenyl phenols have been known to be dark colored, and to produce varnish coatings whose colors range from dark reddish brown to purple or black and tend to become even darker on aging.

The reaction of substituted phenols with formaldehyde to produce resins has been carried out in the presence of acid catalysts, alkaline catalysts having been found to produce resins that are not oil-soluble.

The principal object of the invention is the preparation of oil-soluble phenolic resins that produce varnish coatings of greatly improved color. More specific objects and advantages are apparent from the description, which merely discloses and illustrates the invention and is not intended to impose limitations upon the claims.

In accordance with the present invention, oil-soluble phenolic resins that produce varnish coatings of greatly improved color are prepared by reacting formaldehyde with a p-substituted phenol in which the substituent is a monovalent, mono-olefinic hydrocarbon radical containing from three to four carbon atoms in the presence of a zinc salt of an organic acid whose strength is not substantially greater than that of formic acid.

Varnish coatings produced from resins of the present invention are unusually pale and are remarkably free from darkening upon aging. Varnishes produced from such resins are very fast-drying, even when they are prepared by cooking the resins with oils that are generally considered to be poor drying oils. Moreover, in order to produce varnishes of the usual viscosity, resins of the present invention need not be cooked with drying oils at as high a temperature or for as long a time as prior resins.

In the p-substituted phenol used in preparing a resin embodying the invention, the monovalent, mono-olefinic hydrocarbon substituent may be allyl, propenyl, isopropenyl, 1-butenyl, 2-butenyl, 3-butenyl, 2-methyl propenyl, 2-methyl allyl, 1-ethyl ethenyl, 1-methyl propenyl or 1-methyl allyl. The term "p-substituted phenol" is used herein to designate one of the foregoing phenols which is reacted with formaldehyde to form a resin embodying the invention; of course, it is understood such a phenol may be used in the monomeric or polymeric state, but for simplicity is referred to hereinafter only as the monomer. The preferred substituted phenols are 2-(p-hydroxy phenyl) 2-alkenes having from 9 to 10 carbon atoms, such as 2-(p-hydroxy phenyl) 2-butenes and p-isopropenyl phenol (i. e., wherein the alkenyl is a secondary 2-alkenyl radical).

A resin embodying the invention is prepared by reacting formaldehyde with a substituted phenol described above, in the presence of a zinc salt of an organic acid whose strength is not substantially greater than that of formic acid. It is to be understood that in "reacting" the formaldehyde with the phenol other substances which do or do not take part in the reaction may be included in the reaction mixture, for example, solvents such as hydrogenated gasoline fractions, partially reactive solvents such as dipentene, modifying agents such as rosin or an ester gum, and, of course, other substituted phenols or even unsubstituted phenol.

Formaldehyde or paraformaldehyde may be used for the reaction. If paraformaldehyde is used, it is considered to break down into monomeric formaldehyde which reacts with the phenol.

In the practice of the invention, the molal ratio of formaldehyde to the p-substituted phenol in a reaction mixture is determined to a great extent by the properties desired in the resin such as oil-solubility, and in the resulting varnish coating such as chemical resistance. It has been found that decreasing the proportion of formaldehyde in the reaction mixture tends to improve the oil-solubility of the resin, while increasing the proportion of formaldehyde tends to improve the chemical resistance of the varnish coating. There is no real minimum molal ratio of formaldehyde to the phenol, but for practical purposes about ½ mol of formaldehyde for each mol of the phenol is about the least that is employed. On the other hand, a molal ratio as high as about 2 mols of formaldehyde to each mol of the phenol still results in satisfactory solubility of the resin in such drying oils as tung oil. About 1 to about 1½ mols of formaldehyde to each mol of the phenol is the preferred range in which the resin is readily soluble in practically all drying oils and in which the chemical resistance of the varnish coating is good. The lowest ratios in the preferred range, i. e. about 1 mol of formaldehyde to 1 mol of the phenol, are generally best in that the resulting resins cook into drying oils most rapidly and at the lowest temperatures. If the phenol is polymerized to an appreciable extent, it may be necessary to use a smaller proportion of formaldehyde in order to obtain a resin with satisfactory oil-solubility, for example, as little as about ½ mol of formaldehyde to 1 mol of the phenol.

Any zinc salt of an organic acid whose strength is not substantially greater than that of formic acid may be used as a catalyst for the condensation reaction in the practice of the invention. The "strength" of an organic acid is measured by the dissociation constant ($K_a$) of the acid. Although certain zinc salts may be particularly desirable in special applications (e. g. zinc stearate when a salt of a nonvolatile acid is desired), those generally preferable and producing the best yields are the zinc salts of organic acids of substantially the same strength as formic acid ($K_a = 2.1 \times 10^{-4}$) such as lactic acid $$(K_a = 1.4 \times 10^{-4})$$

acetic acid ($K_a = 1.9 \times 10^{-5}$) and propionic acid ($K_a = 1.4 \times 10^{-5}$). Of this group, zinc acetate is the preferred catalyst since it is readily available commercially and gives extremely good yields of resins possessing excellent properties.

The proportion (i. e., per cent by weight of the phenol) of the zinc salt catalyst may range from the minimum that gives an appreciable catalytic effect in the practice of the invention, for example, about 0.05 per cent, to an amount above which there is little or no increase in catalytic effect, for example, about 1 per cent. The preferred range in which the most satisfactory products are obtained is from about 0.15 to about 0.5 per cent of the catalyst. On the theory that the smaller the proportion of the catalyst the better the product obtained, the optimum proportion of the catalyst is at the lower end of the preferred range, i. e. about 0.15 per cent. The percentages given above are based on the preferred catalyst, zinc acetate, and other zinc salts are used in quantities which give approximately the same zinc ion concentration.

It has been found that decreasing the pH of the reaction mixture generally tends to increase the yield of the resin, but if the pH of the reaction mixture is too low, the resulting resin is extremely dark in color. The pH of the reaction mixture may be as low as a pH equal to that of a mixture of one mol of the phenol with two mols of commercial aqueous formaldehyde to which zinc formate has been added in an amount equal to about one per cent by weight of the phenol. A convenient method of increasing the pH is by the addition of zinc oxide to the reaction mixture. The maximum pH used in the practice of the invention may be as high as a pH equal to that of a mixture of one mol of the phenol with ½ mol of commercial aqueous formaldehyde to which zinc oxide has been added in an amount equal to about ½ per cent by weight of the phenol and in which the zinc salt present is that produced from the neutralization by the zinc oxide of the formic acid which is present in commercial aqueous formaldehyde solutions in an amount equal to about 0.1 per cent by weight of the formaldehyde.

The reaction proceeds at room temperature, but is expedited by higher temperatures. A resin embodying the invention may be prepared by agitating and refluxing for approximately ten to fifteen hours in a suitable container a reaction mixture of formaldehyde and one or more of the p-substituted phenols described herein, in the presence of a zinc salt of an organic acid whose strength is not substantially greater than that of formic acid. When the condensation reaction approaches equilibrium, the refluxing is stopped and the product is then dehydrated in an open vessel until the boiling point has risen to about 130° to 150° C., to remove the volatile matter from the resin.

The production of modified resins is also within the scope of the invention. A modified resin embodying the invention may be prepared by the addition to the reaction mixture of a substance which acts as a solvent and also participates in the reaction, such as dipentene. Also, a modified resin may be prepared by the addition of rosin or an ester gum to the reaction mixture. If rosin is used, a resin that is extremely reactive with drying oils is obtained, and it may be desirable to esterify the rosin in the usual manner (i. e. using glycerol). The esterification reaction may be carried out after the resin condensation is completed. The selection of the modifying substances and their proportions is entirely dependent upon the particular purposes for which the resin is intended. For example, in the case of rosin an amount of the phenol equal to about 22 to 25 per cent by weight of the rosin gives a product that is highly oil-soluble and forms a varnish of the proper viscosity.

The resins embodying the invention possess very high reactivity so that they can be cooked very rapidly into such drying oils as tung, bodied linseed, dehydrated castor, soya and fish oils to form varnishes which produce coatings that are light colored, rapid-drying, hard, and resistant to hot and cold water and alkalis. As compared to the commercially available butyl phenol and phenyl phenol resins, the resins of the invention cook more rapidly and at lower temperatures particularly with such oils as bodied linseed, dehydrated castor and soya, and the varnish coatings produced from the resins of the invention possess a lighter color and greatly improved color retention (in an accelerated weathering test). Moreover, the varnish coatings from the resins embodying the invention are noticeably more resistance to hot and cold water and dry much more rapidly and thoroughly, particularly in the case of the coatings produced from slower drying oils, such as linseed or dehydrated castor oil.

EXAMPLE 1

A varnish is prepared from a reaction product of formaldehyde with one or more p-hydroxy phenyl butenes, for example, a mixture of 2-(p-hydroxy phenyl) 2-butenes obtained as follows:

A mixture of 3,380 grams of phenol (U. S. P.), 864 grams of methyl ethyl ketone, and 300 grams of a 37 per cent aqueous hydrochloric acid solution is held at 85° C. for 17 hours with mechanical stirring. A solution of 138 grams of sodium hydroxide in 322 grams of water is then added, and stirring is continued for one-half hour. After the separation of 415 grams of a water phase containing sodium chloride, followed by the addition of 250 grams of water, stirring is resumed for an additional one-half hour. The water phase is again separated and is found to have a pH of 8.5. The condensation product (4,525 grams), is heated as atmospheric pressure in a stainless steel kettle for five hours with stirring. During that period the liquid temperature rises gradually to 320° C., and the vapor outlet temperature rises to about 280° C. From the condensed vapors a water phase consisting of 473 grams of water saturated with phenol is separated. A black polymerized residue (150 grams) is left in the kettle. The remainder of the condensate (3,875 grams) is fractionally distilled in vacuum to remove 105 grams of a water-phenol mixture and 2,510 grams of phenol having a boiling point of 94–99° C. at 38–41 millimeters of mercury. The residue (1,190 grams) left from the fractional distillation solidifies on cooling to a pale yellow mixture of 2-(p-hydroxy phenyl) 2-butenes, one of which is a crystalline solid melting at 86.5° C., and the other of which is present in smaller proportion and is a liquid having a boiling point of 85–89° C. at one millimeter of mercury.

Condensation is carried out by refluxing with mechanical stirring a charge of the mixture of p-hydroxy phenyl butenes so prepared, formalin (37 per cent aqueous formaldehyde solution) and catalyst (zinc acetate), and the resulting condensation product is dehydrated in an open beaker. A resin is obtained that is brittle, solid and clear when cold.

Tables 1 and 2 (below) show the properties of resins so prepared, and more specifically describe the preparation of each resin by specifying the grams of the mixture of substituted phenols in the charge (line 2), the grams of formalin in the charge (line 3), the grams of catalyst in the charge (line 4), the molal ratio, i. e., mols of formaldehyde to mols of substituted phenols in the charge (line 5), the reflux reaction time in hours (line 6), the dehydration time in hours (line 7) and the dehydration temperature (line 8). Also shown in Tables 1 and 2 are the total yield in grams (line 9), the yield in grams per 100 grams of substituted phenols (line 10), the color of a solution of the resin in an equal weight of toluene (Table 1) and in an amount of xylene equal to two-thirds of the weight of the resin (Table 2) according to the Hellige (Color Comparator) standards (line 11), the viscosity of a solution of the resin in an equal weight of toluene (Table 1) and in an amount of xylene equal to two-thirds of the weight of the resin (Table 2) according to the Gardner-Holdt (Bubble Viscometer standard) scale (line 12), and the acid number of the resin (line 13—Table 1 only).

Table 1

| 1. Sample No | 1A | 1B | 1C | 1D | 1E | 1F |
|---|---|---|---|---|---|---|
| 2. Substituted Phenols (grams) | 444 | 296 | 593 | 200 | 200 | 300 |
| 3. Formalin (grams) | 486 | 194 | 324 | 160 | 160 | 243 |
| 4. Catalyst (grams) | 0.67 | 0.45 | 0.89 | 0.33 | 0.18 | 1.5 |
| 5. Molal Formaldehyde-Phenol Ratio | 2.0 | 1.2 | 1.0 | 1.5 | 1.5 | 1.5 |
| 6. Reflux Time (hours) | 16 | 16 | 16 | 18 | 18 | 18 |
| 7. Dehydration Time (hours) | 2 | 2 | 2 | 2 | 2 | 2 |
| 8. Dehydration Temp. (°C.) | 150 | 150 | 150 | 140 | 140 | 140 |
| 9. Total Yield (grams) | 533 | 320 | 638 | 221 | 226 | 338 |
| 10. Yield (grams) per 100 grams phenol | 120 | 108 | 108 | 111 | 113 | 113 |
| 11. Color | 5L | 5L | 4 | 5L | 6L | 5L |
| 12. Viscosity | E | A | A | A | I | A |
| 13. Acid No | 3.4 | 2.7 | 1.7 | 3.8 | 1.9 | 1.9 |

Table 2

| 1. Sample No | 2A | 2B | 2C | 2D | 2E | 2F |
|---|---|---|---|---|---|---|
| 2. Substituted Phenols (grams) | 296 | 444 | 296 | 1,030 | 1,030 | 2,060 |
| 3. Formalin (grams) | 202 | 243 | 178 | 567 | 624 | 1,248 |
| 4. Catalyst (grams) | 1.5 | 2.2 | 1.5 | 5.2 | 5.2 | 10.3 |
| 5. Molal Formaldehyde-Phenol Ratio | 1.25 | 1.0 | 1.1 | 1.0 | 1.1 | 1.1 |
| 6. Reflux Time (hours) | 18 | 18 | 18 | 17 | 16 | 16 |
| 7. Dehydration Time (hours) | 0.5 | 0.8 | 0.5 | 5.0 | 2.0 | 3.0 |
| 8. Dehydration Temp. (°C.) | 130 | 130 | 130 | 140 | 150 | 150 |
| 9. Total Yield (grams) | 300 | 508 | 340 | 1,101 | 1,140 | 2,270 |
| 10. Yield (grams) per 100 grams phenol | 1.18 | 1.14 | 1.15 | 1.07 | 1.11 | 1.10 |
| 11. Color | 3 | 4L | 3 | 5-5L | 5-5L | 5L |
| 12. Viscosity | H | G-H | J | F | I | G-H |

Resins of particularly good oil-solubility are obtained by use of the proportions described in Table 2.

A resin so prepared may be cooked into a long or short oil varnish, using raw tung, bodied or unbodied linseed, dehydrated castor, raw soya or raw fish oil. For example, a very short oil varnish can be prepared from a charge of 100 grams of the resin with raw tung oil or unbodied dehydrated castor oil. The charge is heated up to a cooking temperature, held at this temperature for a time, and then immediately diluted with an equal weight of a cold commercial hydrogenated petroleum fraction having a boiling point range of 270° F. to 355° F. (Solvesso #2).

Table 3 (below) shows the viscosity of varnishes so prepared, and more specifically describes the preparation of each of the varnishes by specifying the sample number of the resin according to sample number designations given in Table 1 (column 2), the grams of oil in the charge (column 3), the up-heat time in minutes, i. e., the time required to heat the charge up to the cooking temperature, (column 4), the cooking temperature (column 5), the holding time in minutes, i. e., the time for which the charge is held at the cooking temperature (column 6), and the viscosity of a solution of the product in an equal weight of Solvesso #2 according to the Gardner-Holdt scale (column 7).

Table 3

| Varnish Sample No., Col. 1 | Resin Sample No., Col. 2 | Raw Tung Oil (grams,) Col. 3 | Up heat Time (min.,) Col. 4 | Cooking Temp. (°C.,) Col. 5 | Holding Time (min.,) Col. 6 | Viscosity, Col. 7 |
|---|---|---|---|---|---|---|
| 3A | 1B | 100 | 40 | 230 | ---- | A. |
| 3B | 1A | 85 | 40 | 200 | ---- | A. |
| 3C | 1A | 85 | 30 | 175 | 20 | A. |
| 3D | 1D | 85 | 25 | 175 | 20 | A. |
| 3E | 1C | 85 | 35 | 180 | 20 | A. |
| 3F | 1D | 75 | 35 | 175 | 20 | A. |
| 3G | 1F | 85 | 30 | 175 | 40 | A. |
| 3H | 1D | 80 | 50 | 180 | 40 | B. |
| 3I | 1F | 75 | 35 | 200 | 55 | D. |
| 3J | 1D | ¹ 85 | 55 | 250 | 5 | I. |
| 3K | 1F | ¹ 60 | 30 | 260 | 5 | X. |

¹ Unbodied dehydrated castor oil instead of raw tung oil.

Each varnish so prepared is poured onto a metal plate and baked to a light straw-colored coating or film in 30 minutes at 177° C. The resulting coating bends over a ⅛ inch mandrel without cracking and possesses excellent resistance to boiling water, 5 per cent aqueous sodium hypochlorite, 5 per cent aqueous sodium hydroxide and 10 per cent aqueous ammonia solutions.

A 25 gallon length tung, bodied linseed ($Z_2$ viscosity—Gardner-Holdt scale), unbodied linseed, dehydrated castor ($Z_3$ viscosity—Gardner-Holdt scale), raw soya, or raw fish oil varnish is prepared from a charge of 100 grams of the resin and 200 grams of the oil. The charge is heated up to a cooking temperature, held at this temperature for a period of time (the holding time) and then quenched by pouring into an equal weight of cold mineral spirits. When raw tung oil is used, the charge should be quenched at the end of the holding time, but a charge containing any other oil may be allowed to cool or "drift" back to a temperature of about 230° C. before it is quenched.

Table 4 (below) shows the properties of varnishes so prepared, and more specifically describes the preparation of each of the varnishes by specifying the sample number of the resin in the charge (column 2), the type of oil in the charge (column 3), the up-heat time in minutes (column 4), the cooking temperature (column 5) and the holding time in minutes (column 6). The viscosity according to the Gardner-Holdt scale (column 7) and the color according to the Hellige standards (column 8) are shown for a solution of the product in an equal weight of mineral spirits.

A suitable drier (lead or cobalt naphthenate or a mixture thereof) is added to a solution of the varnish in an equal weight of mineral spirits and the solution is allowed to stand for 24 hours before a drying test is run. In the drying test the varnish is poured onto a plate and allowed to dry in the air at room temperature while an operator presses the surface of the varnish with his finger at regulator intervals. The length of time in which the varnish becomes dry enough not to stick to the operator's finger is called the "set" time and the length of time in which the varnish becomes hard enough to leave a print which can be removed easily by rubbing even if the operator has pressed his finger on the varnish as hard as he can is called the "dry" time.

Table 5 (below) shows the drying test results for varnishes prepared as hereinbefore described and more specifically describes the composition of the varnishes employed in the drying test by specifying the per cent (by weight of the oil) of lead (Pb) (column 2) and the per cent (by weight of the oil) of cobalt (Co) (column 3). The "set" time in minutes (column 4) and the "dry" time in minutes (column 5) are shown.

Table 5

| Varnish Sample No., Col. 1 | Per Cent Pb, Col. 2 | Per Cent Co, Col. 3 | Set Time (min.) Col. 4 | Dry Time (min.) Col. 5 |
|---|---|---|---|---|
| 4A | 0.3 | 0.03 | 60 | 90 |
| 4B | 0.3 | 0.03 | 60 | 90 |
| 4C | ---- | 0.2 | 120 | 180 |
| 4D | ---- | 0.2 | 90 | 180 |
| 4E | ---- | 0.02 | 30 | 180 |
| 4F | ---- | 0.2 | 30 | 90 |
| 4G | ---- | 0.2 | 30 | 90 |
| 4H | ---- | 0.2 | 30 | 90 |
| 4I | ---- | 0.05 | 180 | 360 |
| 4J | 0.5 | 0.05 | 270 | 450 |
| 4K | ---- | 0.2 | 90 | 336 |
| 4L | 0.5 | 0.05 | 120 | 390 |

The resins of the invention give rapid-drying varnish coatings with all drying oils, even those Table 4

| Varnish Sample No., Col. 1 | Resin Sample No., Col. 2 | Type of Oil, Col. 3 | Upheat Time (min.) Col. 4 | Cooking Temp. (° C.) Col. 5 | Holding Time (min.) Col. 6 | Viscosity, Col. 7 | Color, Col. 8 |
|---|---|---|---|---|---|---|---|
| 4A | 2C | Raw Tung | 30 | 238 | 45 | E-F | 5 |
| 4B | 2E | do | 29 | 238 | 45 | E | 5 |
| 4C | 2C | Bodied Linseed. | 35 | 260 | 35 | G-H | 7L |
| 4D | 2E | do | 30 | 260 | 30 | E-F | 6L |
| 4E | 2D | do | 35 | 260 | 30 | K | 6 |
| 4F | 2A | Unbodied Linseed. | 45 | 300 | 30 | E-F | 6 |
| 4G | 2B | do | 45 | 300 | 30 | E-F | 7L |
| 4H | 2C | do | 45 | 300 | 30 | E-F | 7L |
| 4I | 2C | Dehydrated Castor. | 37 | 260 | 33 | I | 6L |
| 4J | 2E | do | 34 | 260 | 31 | E-F | 5 |
| 4K | 2B | Raw Soya | 65 | 305 | 118 | E-F | 8 |
| 4L | 2B | Raw Fish | 61 | 305 | 40 | D | 8 | which are ordinarily considered to be poor drying oils, whereas the substituted phenol resins heretofore available (p-butyl phenol and p-phenyl phenol) show fast drying properties with tung oil only. Also, lower cooking temperatures and less time are required to produce varnishes of the same viscosity from the resins of the invention with boiled and unboiled linseed, dehydrated castor and raw soya oils. The varnish coatings of the invention are light colored (having a slight reddish cast) and have excellent resistance to boiling water and cold water. The color retention of the varnish coatings of the invention in an accelerated weathering (Weather-Ometer) test is much better than that of varnish coatings of other commercially available substituted phenol resins, which yellow considerably in the weathering test.

EXAMPLE 2

A procedure is carried out that is the same as that described in the second paragraph of Example 1 except that dipentene is added to the charge.

Table 6 (below) shows the properties of resins so prepared, and more specifically describes the preparation of each resin by specifying the grams of the mixture of substituted phenols in the charge (line 2), the grams of formalin in the charge (line 3), the grams of dipentene in the charge (line 4), the grams of catalyst in the charge (line 5), the molal ratio (line 6), the reflux reaction time in hours (line 7), the dehydration time in hours (line 8) and the dehydration temperature (line 9). Also shown in Table 6 are the total yield in grams (line 10), the yield in grams per 100 grams of the mixture of substituted phenols (line 11), the acid number (line 12), the color of a solution of the resin in an equal weight of toluene according to the Hellige standards (line 13) and the viscosity of a similar toluene solution according to the Gardner-Holdt scale (line 14).

Table 6

| 1. Sample No. | 6A | 6B | 6C | 6D | 6E | 6F | 6G |
|---|---|---|---|---|---|---|---|
| 2. Substituted phenols (grams) | 1,000 | 500 | 500 | 500 | 500 | 600 | 600 |
| 3. Formalin (grams) | 548 | 412 | 545 | 400 | 545 | 393 | 318 |
| 4. Dipentene (grams) | 250 | 125 | 125 | 125 | 125 | 150 | 150 |
| 5. Catalyst (grams) | 5.0 | 2.5 | 2.5 | 2.5 | 2.5 | 3.0 | 3.0 |
| 6. Molal Formaldehyde-Phenol Ratio | 1.0 | 1.5 | 2.0 | 1.5 | 2.0 | 1.2 | 1.0 |
| 7. Reflux Time (hours) | 18 | 18 | 18 | 18 | 18 | 18 | 19 |
| 8. Dehydration Time (hours) | 1 2 | 1 2 | 1 2 | 3 | 3 | 2 | 2 |
| 9. Dehydration Temp (°C) | 140 | 140 | 145 | 170 | 170 | 180 | 180 |
| 10. Total yield (grams) | 1,189 | 611 | 640 | 588 | 610 | 675 | 647 |
| 11. Yield (grams) per 100 grams phenol | 119 | 122 | 128 | 118 | 122 | 112 | 108 |
| 12. Acid No. | 3.0 | 3.4 | 4.9 | 2.4 | 2.9 | 3.6 | 5.6 |
| 13. Color | 5L | 5L | 5L | 5L | 5L | 5L | 6L |
| 14. Viscosity | C | A | A | A | A | B | A |

¹ Vacuum used to distill off last traces of dipentene.

Dipentene is an active type of solvent which reacts in the condensation to some extent and improves the oil-solubility of the resin. However, from the table it can be seen that the other properties of the dipentene-modified resins are substantially the same. The resins may be cooked into a varnish by the procedure described in Example 1, and the varnishes so produced have substantially the same properties as the varnishes of Example 1.

EXAMPLE 3

A charge of gum rosin (WW grade), a mixture of p-hydroxy phenyl butenes prepared by the procedure described in the first paragraph of Example 1, formalin, a solvent such as dipentene or a hydrogenated petroleum fraction having a boiling point range of 345° F. to 400° F. (Solvesso #3) and a catalyst (zinc acetate) is refluxed with mechanical stirring. The resulting condensation product is dehydrated by heating up to 180° C. in an open beaker.

The modified resin so produced may be esterified by adding glycerol to the modified resin at 180° C. in a container equipped with an air condenser, raising the temperature rapidly to 270°–275° C. and holding it there for the length of time required to complete the esterification reaction. The air condenser permits the steam to escape but retains the glycerol. If carbon dioxide is bubbled through the reacting charge, the product is slightly lighter in color.

Table 7 (below) shows the properties of modified resins so prepared (esterified or unesterified) and more specifically describes the preparation of each of the modified resins by specifying the grams of rosin in the charge (line 2), the grams of glycerol used in the esterification process if the modified resin is esterified (line 3), the grams of the mixture of substituted phenols in the charge (line 4), the grams of formalin in the charge (line 5), the grams of catalyst in the charge (line 6), the grams of dipentene in the charge (line 7), the grams of Solvesso #3 in the charge (line 8), the reflux reaction time in hours (line 9), the dehydration time in hours (line 10) and the esterification reaction time in hours if the modified resin is esterified (line 11). Also shown in Table 7 are the acid number of the modified resin (line 12), the color of a solution of the modified resin in an equal weight of mineral spirits according to the Hellige standards (line 13), the viscosity of a similar solution according to the Gardner-Holdt scale (line 14), the dilution ratio for mineral spirits, i. e., the ratio of the weight of modified resin to the maximum weight of mineral spirits that is miscible with the resin (line 15) and the yield in grams per 100 grams of rosin used (line 16).

Table 7

| 1. Sample No. | 7A | 7B | 7C | 7D | 7E | 7F |
|---|---|---|---|---|---|---|
| 2. Rosin (grams) | 1,000 | 1,000 | 1,000 | 1,000 | 1,000 | 1,000 |
| 3. Glycerol (grams) | 105 | 105 | 120 | | | |
| 4. Substituted Phenols (grams) | 200 | 150 | 200 | 150 | 200 | 150 |
| 5. Formalin (grams) | 329 | 246 | 329 | 267 | 329 | 246 |
| 6. Catalyst (grams) | 5.0 | 5.0 | 5.0 | 2.5 | 2.5 | 5.0 |
| 7. Dipentene (grams) | 200 | 200 | | | | |
| 8. Solvesso #3 (grams) | | | 200 | 200 | 200 | 200 |
| 9. Reflux Time (hours) | 18 | 18 | 18 | 24 | 21 | 18 |
| 10. Dehydration Time (hours) | 4 | 4 | 4 | 4 | 3 | 2 |
| 11. Esterification Time (hours) | 8 | 8 | 7.5 | | | |
| 12. Acid No. | 27 | 19 | 20 | 133 | 121 | 128 |
| 13. Color | 6 | 6L | 7 | 5 | 6L | 6L |
| 14. Viscosity | Z | O | Z3 | O | X | H |
| 15. Dilution Ratio | 1:3 | (¹) | 1:2 | 1:2 | 1:2 | 1:3 |
| 16. Yield (grams) per 100 grams rosin | 121 | 117 | 120 | 116 | 122 | 118 |

¹ Infinite Dilution.

The resins so produced (esterified or unesterified) may be cooked into a varnish by the procedure described in Example 1. For example, a 25 gallon length oil varnish is prepared from a charge of 100 grams of resin sample number 7C (described in Table 7) and 200 grams of bodied linseed oil (Z₂ viscosity—Gardner-Holdt scale). The charge is heated up over a period of 29 minutes to a cooking temperature of 305° C. and held at this temperature for 50 minutes. The charge is allowed to cool or "drift" to a temperature of 232° C. and is then quenched in an equal weight of mineral spirits. The solution in mineral spirits so prepared has a color of 8L according to the Hellige standards and a viscosity of F according to the Gardner-Holdt scale. A drier consisting of 0.5 per cent (by weight of the oil) of lead (contained in lead naphthenate) and 0.08 per cent (by weight of the oil) of cobalt (contained in cobalt naphthenate) is added to the mineral spirits solution and the solution is allowed to stand 24 hours before a drying test is run. In the drying test the "set" time is 3½ hours and the "dry" time is 5¾ hours.

In another example, an 8 gallon length oil varnish is prepared from a charge of 100 grams of resin sample number 7D (described in Table 7) and 63 grams of raw tung oil. The charge is heated up over a period of 35 minutes to a cooking temperature of 250° C., is held at this temperature for 20 minutes and then is quenched in an equal weight of mineral spirits. The solution in mineral spirits so prepared has a viscosity of E according to the Gardner-Holdt scale and a color of 6 according to the Hellige standards.

In still another example, a 10 gallon length oil varnish is prepared from a charge of 100 grams of resin sample number 7E (described in Table 7) and 39.3 grams of raw tung oil. The charge is heated up over a period of 24 minutes to 288° C., cooled or "checked" by the addition of 39.3 more grams of bodied linseed oil, reheated over a period of 14 minutes to 279° C. and then quenched in an equal weight of mineral spirits. The solution in mineral spirits so prepared has a color of 6 according to the Hellige standards and a viscosity of C according to the Gardner-Holdt scale. A drier consisting of 0.3 per cent (by weight of the oil) of lead (contained in lead naphthenate) and 0.015 per cent (by weight of the oil) of cobalt (contained in cobalt naphthenate) is added to the mineral spirits solution and the solution is allowed to stand 24 hours before a drying test is run. In the drying test the "set" time is 1 hour and the "dry" time is 2 hours.

Varnishes prepared from these modified resins (esterified or unesterified) give light-colored coatings which possess excellent resistance to boiling water and to 1 per cent aqueous sodium hydroxide solution.

EXAMPLE 4

A charge of ester gum, a mixture of p-hydroxy phenyl butenes prepared by the procedure described in the first paragraph of Example 1, formalin, Solvesso #3 and a catalyst (zinc acetate) is refluxed with mechanical stirring. The resulting condensation product is dehydrated by heating up to 250° C. in an open beaker. The ester gum used consists of 50 per cent glycerol-modified gum rosin and 50 per cent glycerol-modified wood rosin and has an acid number of 9.4, and a solution thereof in an equal weight of mineral spirits has a color of 6 according to the Hellige standards and a viscosity of less than A according to the Gardner-Holdt scale.

Table 8 (below) shows the properties of modified resins so prepared and more specifically describes the preparation of each of the modified resins by specifying the grams of ester gum in the charge (line 2), the grams of the mixture of substituted phenols in the charge (line 3), the grams of formalin in the charge (line 4), the grams of catalyst in the charge (line 5), the grams of Solvesso #3 in the charge (line 6), the reflux reaction time in hours (line 7) and the dehydration time in hours (line 8). Also shown in Table 8 are the acid number of the modified resin (line 9), the color of a solution in an equal weight of mineral spirits according to the Hellige standards (line 10), the viscosity of a similar solution according to the Gardner-Holdt scale (line 11), the dilution ratio for mineral spirits (line 12) and the yield in grams per 100 grams of ester gum used (line 13).

*Table 8*

| 1. Sample No. | 8A | 8B | 8C |
|---|---|---|---|
| 2. Ester gum (grams) | 1,000 | 500 | 500 |
| 3. Substituted phenols (grams) | 200 | 80 | 60 |
| 4. Formalin (grams) | 329 | 131 | 99 |
| 5. Catalyst (grams) | 2.5 | 1.25 | 1.25 |
| 6. Solvesso #3 (grams) | 200 | 100 | 100 |
| 7. Reflux Time (hours) | 21 | 20 | 24 |
| 8. Dehydration Time (hours) | 3½ | 4 | 4 |
| 9. Acid No. | 14 | 18 | 11 |
| 10. Color | 7L | 7 | |
| 11. Dilution Ratio | 1:1 | 1:1 | 1:2 |
| 12. Viscosity | Z | Z4 | H |
| 13. Yield (grams) per 100 grams ester gum | 123 | 125 | 117 |

The resins so produced may be cooked into a varnish by the procedure described in Example 1. For example, a 25 gallon length oil varnish is prepared from a charge of 100 grams of resin sample number 8B (described in Table 8) and 200 grams of raw tung oil. The charge is heated up over a period of 70 minutes to a cooking temperature of 250° C., held at this temperature for 10 minutes, and then quenched in an equal weight of mineral spirits. The solution in mineral spirits so prepared has a viscosity of less than C according to the Gardner-Holdt scale and a color of 6 according to the Hellige standards. A drier consisting of 0.2 per cent (by weight of the oil) of lead (contained in lead naphthenate) and 0.02 per cent (by weight of the oil) of cobalt (contained in cobalt naphthenate) is added to the mineral spirits solution and the solution is allowed to stand 24 hours before a drying test is run. In the drying test the "set" time is ¾ hour and the "dry" time is less than 2 hours.

Varnishes prepared from these modified resins give light-colored coatings which possess excellent resistance to boiling water and to 5 per cent aqueous sodium hydroxide solution.

EXAMPLE 5

A varnish is prepared from a reaction product of formaldehyde with one or more p-hydroxy phenyl propenes, for example, a partially polymerized p-isopropenyl phenol obtained as follows: A mixture of 2820 grams of phenol (U. S. P), 696 grams of acetone, and 300 grams of a 37 per cent aqueous hydrochloric acid solution is held at 85° C. for 16 hours with mechanical stirring. The reaction mixture is washed once by adding 600 grams of water, stirring the mix for five minutes, allowing the water to settle out in a layer and drawing off the water. The reaction mixture is treated a second time by adding 600 grams of water, stirring the mix for five minutes, allowing the water to settle out in a layer and then gradually adding 75 grams of calcium carbonate. When the evolution of carbon dioxide ceases, the mix is again stirred for five minutes. After the water settles out in a layer and is drawn off, a third 600 gram water wash is carried out in the same manner as the first wash, and the hot washed solution is filtered. The water phases in the last two washes are found to have a pH of about 5.8 to 6.0. During the wash procedures the temperature of the solution is kept at 70 to 80° C., since if the temperature falls to 30° to 40° C., the condensation product crystallizes out in the form of a golden yellow mass. The condensation product is heated at atmospheric pressure in a stainless steel kettle for 5½ hours while a stream of carbon dioxide is passed through the liquid. During that period the liquid temperature rises gradually to about 360° C., and the vapor outlet temperature rises to about 304° C. The condensate of the vapor initially distilled off consists of a water phase, which separates and is removed, and a small amount of free phenol. The remainder of the distillate is a medium straw-colored liquid. A black polymerized residue is left in the kettle. The phenol layer which separates from the initial condensate and the remainder of the condensate (2990 grams total) are vacuum distilled through a short packed column until the liquid temperature reaches about 190° C., to remove water (35 grams) and phenol (1605 grams). Then distillation is immediately stopped, and the residue (1350 grams) left from the fractional distillation is a yellow, transparent non-distillable liquid which solidifies on cooling to a semi-solid transparent mass of partially polymerized p-iospropenyl phenol. Evidence indicates that some of the phenol may not be polymerized, but the mass consists essentially of a mixture of low molecular weight polymers.

A charge of 75 grams of the p-hydroxy phenyl propene mixture so prepared, 150 grams of formalin, 100 grams of Solvesso #3, 1.25 grams of catalyst (zinc acetate) and 500 grams of gum rosin (WW grade) is refluxed for 24 hours with mechanical stirring. The resulting condensation product is dehydrated in an open beaker by heating up to 240° C. over a period of 3 hours. The remaining material (625 grams) is poured out and cooled to form a straw-colored, brittle, clear resin having an acid number of 127. A solution of the resin in an equal weight of mineral spirits has a color of 6 according to the Hellige standards.

Resins so produced may be cooked into varnishes by the procedure described in Example 1. For example, an 8 gallon length oil varnish is prepared from a charge of 100 grams of the resin and 31.5 grams of raw tung oil. The charge is heated up over a period of 12 minutes to 288° C., cooled or "checked" by the addition of 31.5 more grams of tung oil, reheated over a period of 4 minutes to 279° C., and then quenched in an equal weight of mineral spirits. The solution in mineral spirits so prepared has a color of 7L according to the Hellige standards and a viscosity of E to F according to the Gardner-Holdt scale. A drier consisting of 0.3 per cent (by weight of the oil) of lead (contained in lead naphthenate), 0.015 per cent (by weight of the oil) of cobalt (contained in cobalt naphthenate) and 0.015 per cent (by weight of the oil) of manganese (contained in manganese naphthenate) is added to the mineral spirits solution and the solution is allowed to stand 24 hours before a drying test is run. In the drying test the "set" time is ¾ hour and the "dry" time is 1 hour.

Varnishes prepared from these resins give light-colored coatings which possess substantially the same properties as those described in Example 1.

EXAMPLE 6

A charge of 500 grams of ester gum (described in Example 4), 75 grams of a p-hydroxy phenyl propene mixture prepared by the procedure given in the first paragraph of Example 5, 150 grams of formalin, 100 grams of Solvesso #3 and 1.25 grams of catalyst (zinc acetate) is refluxed for 20 hours with mechanical stirring. The resulting condensation product is dehydrated in an open beaker by heating up to 245° C. over a period of 3 hours. The remaining material (601 grams) is poured out and cooled to form a brittle, straw-colored transparent resin having an acid number of 6 and a dilution ratio of 1:2 in mineral spirits. A solution of the resin in an equal weight of mineral spirits has a color of 6 according to the Hellige standards and a viscosity of G according to the Gardner-Holdt scale.

A resin so produced may be cooked into varnishes by the procedure described in Example 1. For example, a 20 gallon length oil varnish is prepared from a charge of 100 grams of the resin and 163 grams of bodied linseed oil ($Z_2$ viscosity—Gardner-Holdt scale). The charge is heated up over a period of 20 minutes to a cooking temperature of 305° C., and held at this temperature for 45 minutes. The charge is allowed to cool or "drift" to a temperature of 230° C. and is then quenched in an equal weight of mineral spirits. The solution in mineral spirits so prepared has a color of 8L according to the Hellige standards and a viscosity of B to C according to the Gardner-Holdt scale. A drier consisting of 0.5 per cent (by weight of the oil) of lead (contained in lead naphthenate) and 0.08 per cent (by weight of the oil) of cobalt (contained in cobalt naphthenate) is added to the mineral spirits solution and the solution is allowed to stand 24 hours before a drying test is run. In the drying test the "set" time is 3 hours and the "dry" time is 4½ hours.

Varnishes prepared from this modified resin give light-colored coatings which possess substantially the same properties as those described in Example 1.

EXAMPLE 7

A charge of 296 grams of a mixture of p-hydroxy phenyl butenes prepared by the procedure given in the first paragraph of Example 1, 178 grams of formalin and 4.3 grams of zinc stearate is refluxed for 16 hours with mechanical stirring. The resulting condensation product is dehydrated for ¾ hour at 150° C. in an open beaker. A resin is obtained that is brittle, solid and clear when cold. A 60 per cent solution of the resin in xylene has a color of 5L according to the Hellige standards and a viscosity of less than H according to the Gardner-Holdt scale. Other zinc soaps may be used as catalysts by the same procedure to produce resins of substantially the same properties. Resins so produced may be cooked into a varnish by the procedure described in Example 1, and the results are substantially the same as in Example 1.

EXAMPLE 8

A procedure is carried out that is the same as that of Example 7 except that the catalyst used is 0.55 gram of zinc oxide instead of the zinc stearate and the condensation product is dehydrated for 2.75 hours at 150° C. (The commercial formalin used contains about 0.04 per cent of formic acid, which reacts with about 0.05 gram of the zinc oxide to form about 0.12 of zinc formate.) A 60 per cent solution of the resin in xylene has a color of 5 according to the Hellige standards and a viscosity of G according to the Gardner-Holdt scale. Resins so produced may be cooked into a varnish by the produce described in Example 1, and the results are substantially the same as in Example 1.

EXAMPLE 9

A procedure is carried out that is the same as that given in Example 7 except that the catalyst used is 2.14 grams of zinc hexanoate instead of the zinc stearate. A 60 per cent solution of the resulting resin in xylene has a color of 5 to 5L according to the Hellige standards and a viscosity of K according to the Gardner-Holdt scale. Resins so produced may be cooked into a varnish by the procedure described in Example 1, and the results are substantially the same as in Example 1.

EXAMPLE 10

A procedure is carried out that is the same as that given in Example 7 except that the catalyst used is 1.29 grams of zinc formate instead of the zinc stearate and the condensation product is dehydrated for 3.3 hours at 150° C. A 60 per cent solution of the resulting resin in xylene has a color of 5 according to the Hellige standards and a viscosity of A according to the Gardner-Holdt scale. Resins so produced may be cooked into a varnish by the procedure described in Example 1, and the results are substantially the same as in Example 1. Catalysts consisting of zinc salts of organic acids of substantially the same strength as formic acid, such as lactic, acetic and propionic acid, give the best yields.

Having described the invention, I claim:

1. A method of preparing a resin by reacting 0.5-2 mols of formaldehyde with 1 mol of a compound of the class consisting of mono-substituted phenols whose substituent in each case is a mono-olefinic hydrocarbon radical and polymers thereof, characterized (1) by said radical being in the para position and having from three to four carbon atoms and (2) by carrying out the reaction in the presence of, as a catalyst, a zinc salt of an organic acid whose strength is not substantially greater than that of formic acid, whereby there is obtained an oil-soluble resin that produces varnish coatings of greatly improved color.

2. A method as claimed in claim 1 in which one mol of formaldehyde is used for each mol of mono-substituted phenol.

3. A method as claimed in claim 1 in which said radical is a secondary 2-alkenyl radical.

4. A method as claimed in claim 3 in which one mol of formaldehyde is used for each mol of mono-substituted phenol.

5. A method as claimed in claim 4 in which the zinc salt is zinc acetate.

6. A method as claimed in claim 1 in which the zinc salt is zinc acetate.

7. An oil-soluble phenolic resin that produces varnish coatings of greatly improved color, prepared by a method as claimed in claim 1.

8. An oil-soluble phenolic resin that produces varnish coatings of greatly improved color, prepared by a method as claimed in claim 1, in which one mol of formaldehyde is used for each mol of mono-substituted phenol.

9. An oil-soluble phenolic resin that produces varnish coatings of greatly improved color, prepared by a method as claimed in claim 1, in which said radical is a secondary 2-alkenyl radical.

10. A resin as claimed in claim 9, in the preparation of which one mol of formaldehyde is used for each mol of mono-substituted phenol.

11. A resin as claimed in claim 10, in the preparation of which the zinc salt used is zinc acetate.

12. An oil-soluble phenolic resin that produces varnish coatings of greatly improved color, prepared by a method as claimed in claim 1, in which the zinc salt is zinc acetate.

13. A method of preparing a varnish that produces coatings of greatly improved color, which comprises (A) preparing a resin by reacting 0.5-2 mols of formaldehyde with 1 mol of a compound of the class consisting of (a) mono-substituted phenols whose substituent in each case is a mono-olefinic hydrocarbon radical and (b) polymers thereof, the radical being in the para position and having from three to four carbon atoms, and the reaction being carried out in the presence of, as a catalyst, a zinc salt of an organic acid whose strength is not substantially greater than that of formic acid, and (B) cooking said resin with a drying oil.

14. A method as claimed in claim 13 in which from 1 to 1.5 mols of formaldehyde is used for each mol of mono-substituted phenol.

15. A method of preparing a dipentene-modified resin by reacting 1-1.5 mols of formaldehyde, in the presence of dipentene, with 1 mol of a compound of the class consisting of (a) mono-substituted phenols whose substituent in each case is a mono-olefinic hydrocarbon radical and (b) polymers thereof, characterized (1) by said radical being in the para position and having from three to four carbon atoms and (2) by carrying out the reaction in the presence of, as a catalyst, a zinc salt of an organic acid whose strength is not substantially greater than that of formic acid, whereby there is obtained an oil-soluble resin that produces varnish coatings of greatly improved color.

16. A method of preparing a varnish that produces coatings of greatly improved color, which comprises (A) preparing a dipentene-modified resin by reacting 1-1.5 mols of formaldehyde, in the presence of dipentene, with 1 mol of a compound of the class consisting of (a) mono-substituted phenols whose substituent in each case is a mono-olefinic hydrocarbon radical and (b) polymers thereof, the radical being in the para position and having from three to four carbon atoms, and the reaction being carried out in the presence of, as a catalyst, a zinc salt of an organic acid whose strength is not substantially greater than that of formic acid, and (B) cooking said resin with a drying oil.

17. A method of preparing a rosin-modified resin by reacting 1-1.5 mols of formaldehyde, in the presence of a natural resin of the class consisting of rosin and ester gum, with 1 mol of a compound of the class consisting of (a) mono-substituted phenols whose substituent in each case is a mono-olefinic hydrocarbon radical and (b) polymers thereof, characterized (1) by said radical being in the para position and having from three to four carbon atoms and (2) by carrying out the reaction in the presence of, as a catalyst, a zinc salt of an organic acid whose strength is not substantially greater than that of formic acid, whereby there is obtained an oil-soluble resin that produces varnish coatings of greatly improved color.

18. A method of preparing a varnish that produces coatings of greatly improved color which comprises (A) preparing a resin by reacting 1-1.5 mols of formaldehyde in the presence of a natural resin of the class consisting of rosin and ester gum, with 1 mol of a compound of the class consisting of (a) mono-substituted phenols whose substituent in each case is a mono-olefinic hydrocarbon radical and (b) polymers thereof, the radical being in the para position and having from three to four carbon atoms, and the reaction being carried out in the presence of, as a catalyst, a zinc salt of an organic acid whose strength is not substantially greater than that of formic acid, and (B) cooking said resin with a drying oil.

19. A varnish that produces coatings of greatly improved color prepared by a method as claimed in claim 13.

20. A resin that produces varnish coatings of greatly improved color prepared by a method as claimed in claim 15.

21. An oil-soluble resinous material obtained by reacting (a) 1 mol of a compound of the class consisting of (1) mono-substituted phenols whose substituent in each case is a mono-olefinic hydrocarbon radical and (2) polymers thereof, the radical being in the para position and having from three to four carbon atoms, and (b) 1–1.5 mols of formaldehyde, in the presence of (c) a natural resin of the class consisting of rosin and estergum, and (d) as a catalyst, a zinc salt of an organic acid whose strength is not substantially greater than that of formic acid.

22. An oil-soluble resinous material obtained by reacting (a) 1 mol of a compound of the class consisting of (1) mono-substituted phenols whose substituent in each case is a secondary 2-alkenyl radical in the para position having from three to four carbon atoms, and (2) polymers thereof, and (b) 1–1.5 mols of formaldehyde, in the presence of (c) rosin and (d) zinc acetate.

23. A varnish that produces coatings of greatly improved color, prepared by a method as claimed in claim 18.

JOHN LESLIE JONES.

REFERENCES CITED

The following references are of record in the file of this patent:

UNITED STATES PATENTS

| Number | Name | Date |
|---|---|---|
| 2,006,043 | Dykstra | June 25, 1935 |
| 2,093,481 | Rosenblum | Sept. 21, 1937 |
| 2,321,626 | Rosenblum | June 15, 1943 |